Figure 1:
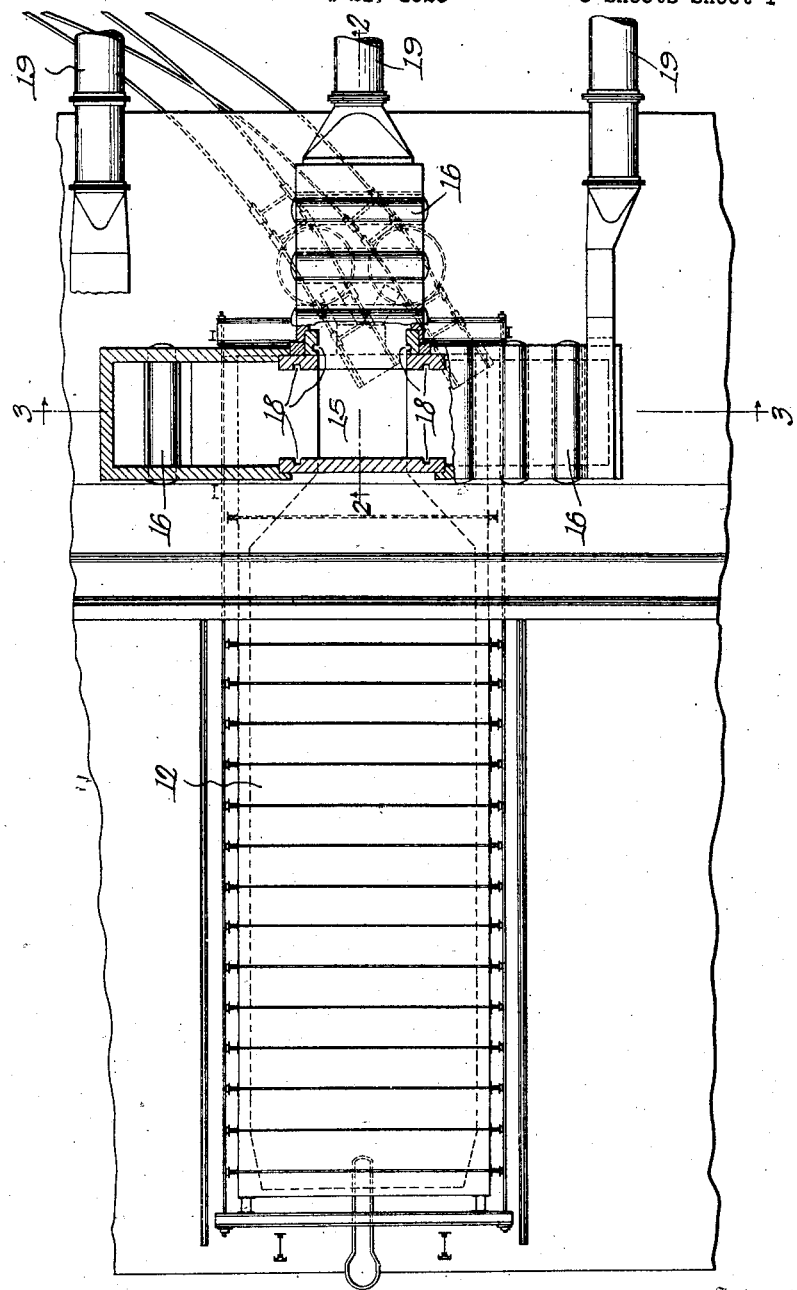

June 21, 1927. 1,632,844
A. G. McGREGOR
REVERBERATORY FURNACE WASTE HEAT BOILER
Filed May 21, 1923 3 Sheets-Sheet 1

June 21, 1927.

A. G. McGREGOR 1,632,844

REVERBERATORY FURNACE WASTE HEAT BOILER

Filed May 21, 1923     3 Sheets-Sheet 3

Patented June 21, 1927.

1,632,844

UNITED STATES PATENT OFFICE.

ALEXANDER GRANT McGREGOR, OF WARREN, ARIZONA.

REVERBERATORY-FURNACE WASTE-HEAT BOILER.

Application filed May 21, 1923. Serial No. 640,409.

In connection with reverberatory furnaces, for the smelting of ores, it is customary practice to cause the gases, discharged from the furnace, to pass through boilers and thus utilize the waste heat from the furnaces. Such boilers are known as waste heat boilers. In the arrangement of these waste heat boilers now generally in use there is an up-take from the furnace which connects into a header flue. Branches are taken off the header flue leading to the boilers. With this arrangement there is a great deal of brick work between the discharge point of the furnace and the inlet point to the boilers.

Four serious objections may be mentioned to this arrangement: 1st. The brick work is subjected to intense heat and the maintenance and repairs on this amount of brick work are important items in the cost of operation. 2nd. The great amount of flue surface permits the infiltration of a great deal of cold air, reducing the efficiency of the waste heat boilers. 3rd. The large amount of surface of the connections between the furnace and boilers affords the radiation of much heat and reduces the boiler efficiency. 4th. The various turns and the length of the connections between furnaces and boilers afford lodgment places for the collection of molten dust particles. Much labor is required for the removal of the accretions thus built up, which become hard and have to be chiselled out, and this has to be done, in some instances, several times in one day. This feature is particularly troublesome when powdered coal is used as fuel for the furnaces.

The present invention has for its object to avoid the objections above referred to and provide a compact arrangement of reverberatory furnace waste heat boilers, such as will utilize the heat escaping from the furnaces to the best advantage. To this end the invention, in its preferred form, comprises a rectangular uptake from the furnace, with the boilers in boiler chambers arranged closely contiguous to three sides of this uptake, and dampers by which any one or more of the boilers may be shut off from the uptake, if desired. In this improved arrangement the bottoms of the floors of the chambers leading from the uptake to the boilers slope downwardly inwardly to the furnace, so that the molten flue dust and fusible ash coming from the furnace and lodging on these floors will drain back into the furnace, thereby avoiding the labor required in the present constructions and arrangements in removing the accretions in the connections between the furnace and boilers at present in use, as above referred to.

Figure 2:
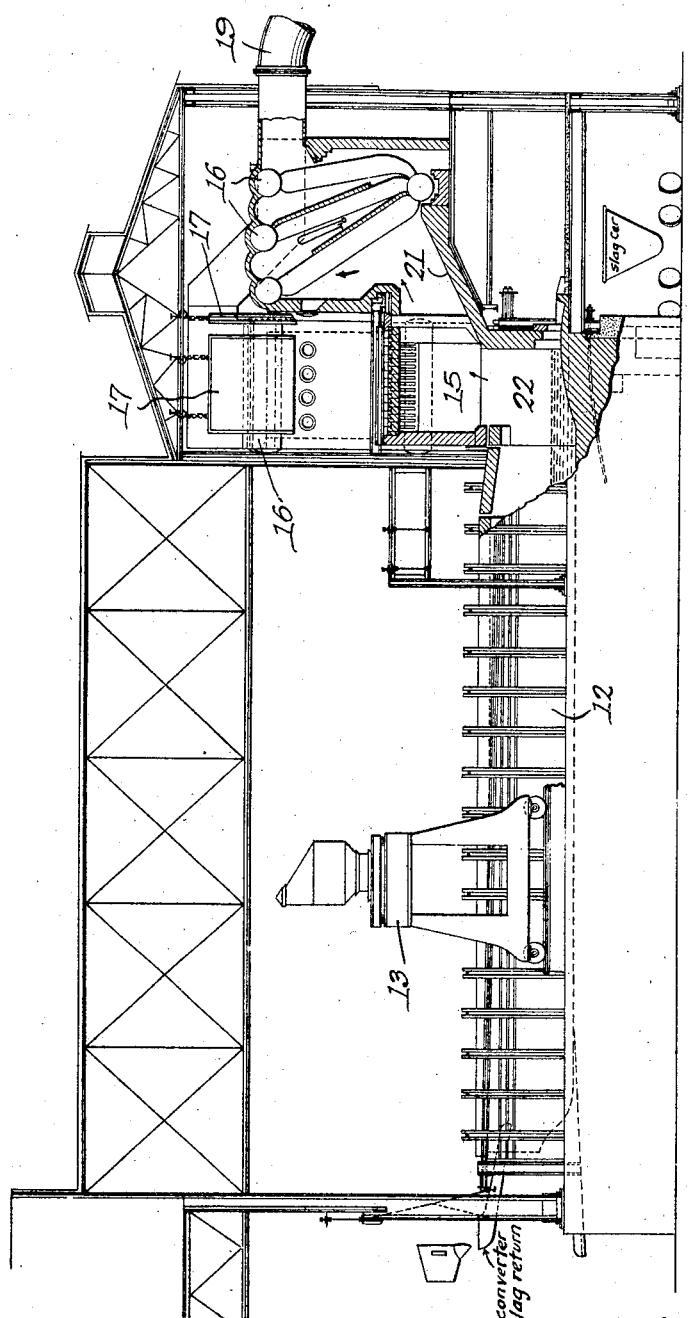
Figure 3:
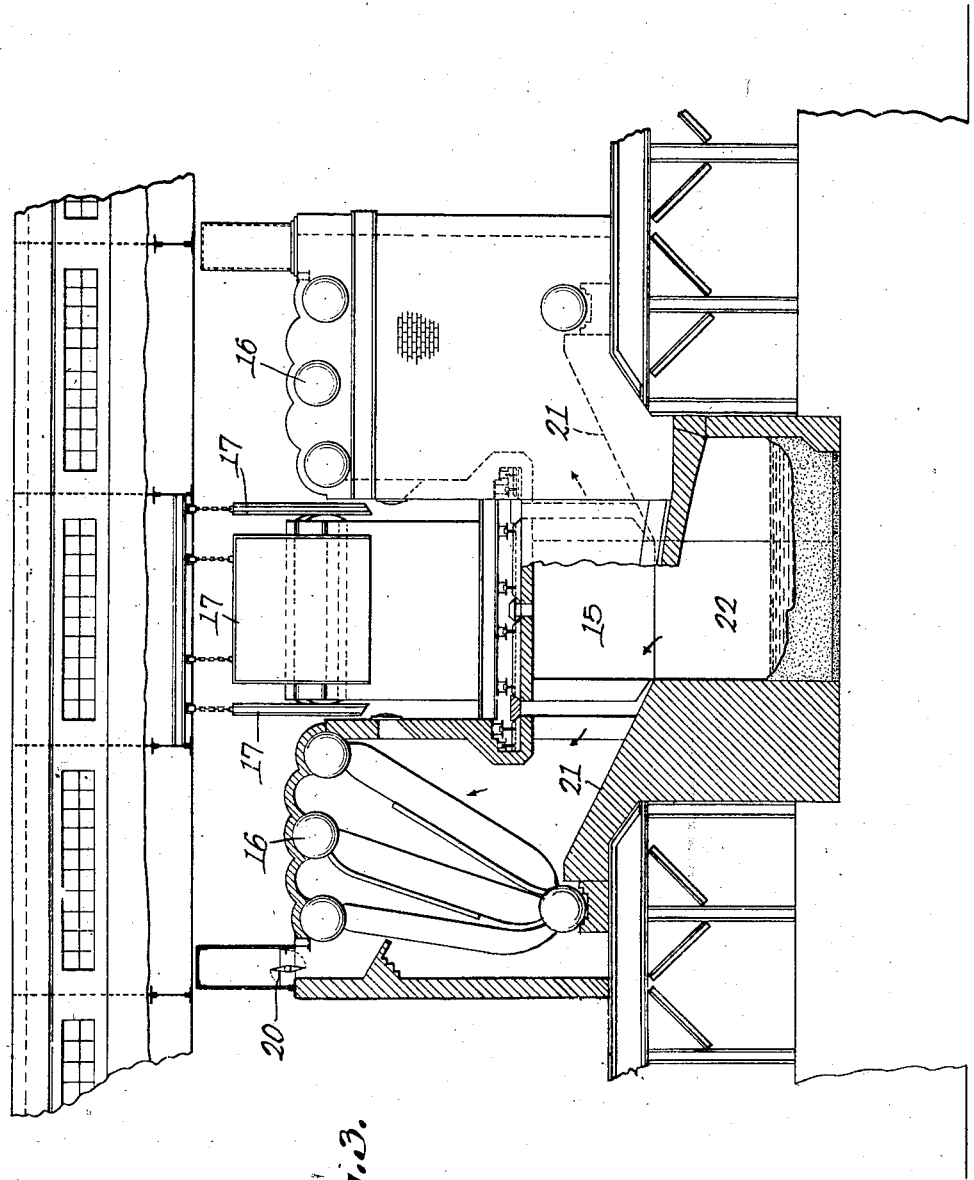

In the accompanying drawings Fig. 1 is a plan view, partly in horizontal section, showing the present improved arrangement of the waste heat boilers relative to a reverberatory furnace. Fig. 2 is a side elevation of the same, partly in vertical section on line 2—2, Fig. 1. Fig. 3 is an elevation, partly in section on line 3—3, Fig. 1.

Referring to the drawings, 12 denotes a reverberatory furnace of well-known or suitable construction to which the comminuted ore or flue dust may be fed by a charging machine 13 which may run on a track 14 at one side of the furnace. Communicating with the chamber of the furnace is a vertical uptake 15, preferably square or of rectangular form in cross section, and having a plurality of flat sides, as more clearly shown in Fig. 1. Arranged closely adjacent to the said uptake, and on three sides thereof, are the waste heat boilers 16, 16, 16. Dampers 17 are preferably arranged closely adjacent to the uptake 15 for controlling the passageways between the said uptake and the chambers in which the waste heat boilers are located, these dampers being vertically movable in slots 18 in the walls of these passageways. By means of these dampers any one or more of the boiler chambers may be shut off from the uptake, if desired. The chambers in which the waste heat boilers are arranged communicate with flues 19 through which the gases are discharged. These flues are preferably provided, adjacent the boiler chambers, with dampers 20 which may be closed when desired.

The floors 21 of the boiler chambers or passageways leading from the uptake 15 to the boilers are sloped downward inwardly toward the furnace, so that any molten material accumulating on these floors will drain back into the part 22 of the furnace chamber.

The circular dotted lines in Fig. 1 denote slag cars and the dotted and full lines denote the tracks on which these cars may run. This feature, however, is not a part of the present invention, and is not herein claimed.

From the foregoing it will be understood that the invention provides a compact arrangement of the waste heat boilers of reverberatory furnaces, so that loss of heat and other objections hereinbefore mentioned to the constructions and arrangements heretofore in use are avoided.

The invention is not to be understood as being limited to the details of construction hereinbefore described and illustrated in the accompanying drawings showing a preferred form of the invention, as such details may be varied widely, within the province of mechanical skill, without departing from the essence of the invention in arranging the waste heat boilers in chambers closely adjacent to and communicating directly with the chamber of an uptake which in turn communicates directly with the chamber of a reverberatory furnace.

Having thus described my invention I claim and desire to secure by Letters Patent:

1. The combination with a reverberatory furnace, of an uptake opening at its bottom directly into the chamber of said furnace, said uptake having a plurality of side openings, a plurality of boiler chambers grouped about and closely adjacent to the sides of said uptake and each communicating directly with the chamber of said uptake through one of said openings, and waste heat boilers in said boiler chambers.

2. An uptake for a reverberatory furnace opening at its bottom directly into the chamber of said furnace and having a plurality of flat sides provided with openings, a plurality of boiler chambers grouped about and closely adjacent to the sides of said uptake and each communicating directly with the chamber of said uptake through one of said openings, combined with waste heat boilers in said boiler chambers, and flues for the discharge of gases from said boiler chambers.

3. The combination with a reverberatory furnace, of an uptake opening at its bottom directly into the chamber of said furnace, said uptake having three side openings, three boiler chambers grouped about and closely adjacent to the sides of said uptake and each communicating directly with the chamber of said uptake through one of said openings, and waste heat boilers in said boiler chambers.

4. The combination with a reverberatory furnace of an uptake opening at its bottom directly into the chamber of said furnace and having a plurality of side openings, a plurality of boiler chambers grouped about and closely adjacent to the sides of said uptake and each communicating directly with the chamber of said uptake through one of said openings and having inwardly and downwardly inclined floors adapted to drain into the furnace chamber through said uptake, and waste heat boilers in said boiler chambers.

5. An uptake for a reverberatory furnace rectangular in cross section and opening at its bottom directly into the chamber of said furnace, said uptake having a plurality of flat sides provided with openings, a plurality of boiler chambers grouped about and closely adjacent to the sides of said uptake and each communicating directly with the chambers of said uptake through one of said openings and having inwardly and downwardly inclined floors adapted to drain into the furnace chamber through said uptake, combined with waste heat boilers in said boiler chambers, and flues for the discharge of gases from said boiler chambers.

In testimony whereof I affix my signature.

ALEXANDER GRANT McGREGOR.